(Model.)
J. H. BARLEY.
Horse Rake.
No. 233,133.          Patented Oct. 12, 1880.
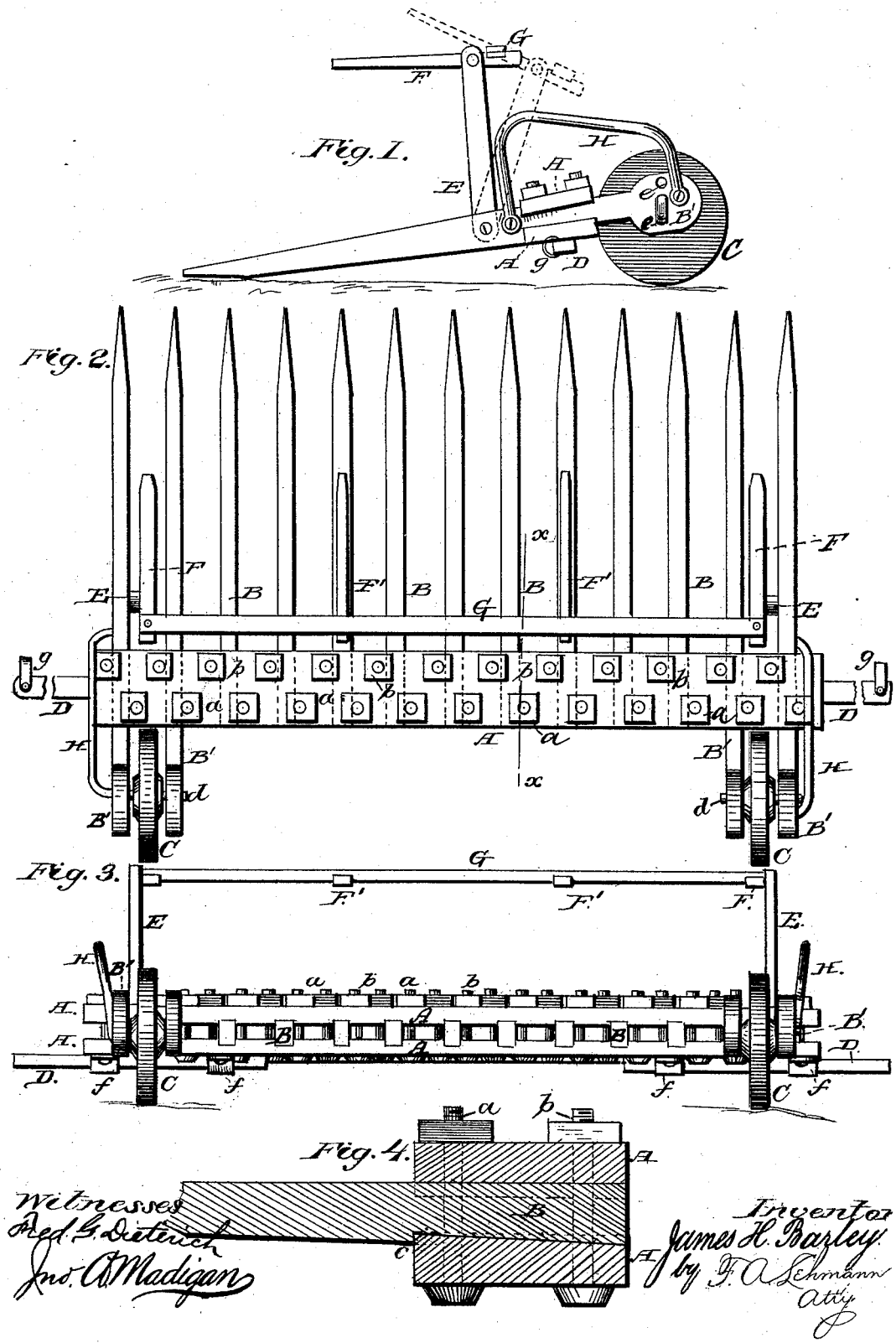

UNITED STATES PATENT OFFICE.

JAMES H. BARLEY, OF SEDALIA, MISSOURI.

HORSE-RAKE.

SPECIFICATION forming part of Letters Patent No. 233,133, dated October 12, 1880.

Application filed June 25, 1880. (Model.)

*To all whom it may concern:*

Be it known that I, JAMES H. BARLEY, of Sedalia, in the county of Pettis and State of Missouri, have invented certain new and useful Improvements in Horse-Rakes; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation. Fig. 2 is a plan or top view. Fig. 3 is a rear elevation, and Fig. 4 is an enlarged section on line $xx$, Fig. 2.

Similar letters of reference indicate corresponding parts in all the figures.

This invention relates to two-horse rakes of that class known as "hay-gatherers," which are used for collecting the hay upon the field and drawing it to the stack or stacking apparatus; and it consists in the improved construction and arrangement of parts, as hereinafter described, and particularly pointed out in the claims.

In the drawings, A A are two parallel planks, which, with that part of the teeth B inserted between them, form the rake-head. Each of these planks A has a series of parallel grooves cut across their inner sides, into which the teeth B are inserted and held firmly in place by a double row of nutted bolts, $a\ b$, which pass through the head on alternate sides of the teeth, so as to clamp the two parts A A of the head firmly down upon these. That part of the teeth B which is clamped in the head is left full width or size, with the exception of a small shoulder, $c$, formed on the bottom side, as shown in Fig. 4, which is cut with a rearward and downward slant, so as to leave the end of the tooth dovetailed, which prevents it from working forward if it should become loosened in the head, while the shoulder $c$ prevents the pushing of the teeth back into or through the head.

The great advantage gained by passing the bolts $a\ b$ through the rake-head, but not through the teeth, in the manner described, is that the rake may be readily and expeditiously taken apart for storing or transportation, and again put together whenever it is desired to use it, all that is necessary to withdraw the teeth being simply to loosen the nuts, so as to slacken the hold of the head A A upon the teeth. If the bolts passed through the teeth instead of on alternate sides of them, they would, of course, have to be withdrawn before the teeth could be removed.

The rake is mounted upon wheels C C, the axles $d$ of which are adjustable in perforations $e\ e$ in rearward-extended heads B' of the two teeth nearest each end of the rake, the head of which may thus be adjusted higher or lower, according to the nature of the soil, to enable the teeth to clear obstructions, and yet collect all the hay upon the ground.

If desired, the bearings B' B', for the adjustable wheels C C, may be made in separate pieces and pivoted upon arms projecting rearward from the rake-head, one at each end, in which case the pivoted bearings are made adjustable upon the arms or extensions upon which they are pivoted, and the adjustment of the wheels effected in that manner.

D D are the draft-bars, which are adjustable in stirrups $f\ f$, bolted to the under side of the rake-head, and are provided each with a clevis, $g$, at its outer end for the attachment of the single-tree. The horse on each side is hitched close up against the draft-bar to prevent possibility of contact with the points of the teeth, and this also greatly relieves the strain upon the team, and has a tendency to lift the points of the rake-teeth slightly up from the ground, so as to avoid absolute contact.

Pivoted upon the inner side of each of the end teeth, B B, is an arm, E, in the other end of which is pivoted another arm, F.

Arms F F are connected by a bar, G, upon which are secured fingers F' F', corresponding in length and shape to the side arms, F F. This pivoted cross-bar G, with its fingers and hinged arms, forms a guard, which, when standing or leaning back against the rake-head, prevents the hay from running over the head while gathering and hauling it to the stack, and also, by depressing the cross-bar G with its fingers down upon the load, prevents the hay from blowing off of the rake when the wind is high during the process of elevating the rake, with its load, to the top of the stack or rick that is being built. Upon each side of the rake is secured a stout bail, H, to which the hooks of the hoisting-gear of the elevating apparatus are attached during the operation of stacking.

I am aware that it is not new to construct a horse-rake of the described class by inserting the rear ends of the teeth between two notched scantlings, and then bolting a bar across the teeth in front of the head for the purpose of stiffening this and bracing the teeth; and I am also aware that it is not new to mount horse-rakes of this class upon wheels which work at the ends of the rake-head; but such constructions I do not claim, broadly.

What I claim as my improvement, and desire to secure by Letters Patent of the United States, is—

1. In a horse-rake, the combination of the transversely-grooved parallel heads A A and the teeth B, provided with dovetailed heads and shoulders $c$, inserted between said grooved heads, and held in place therein, detachably, by clamping-bolts $a$ $b$, inserted vertically through the heads A A on alternate sides of the heads of the teeth, substantially as shown and set forth.

2. The combination, with a horse hay-rake of the described class, of the adjustable folding guard E F G F', substantially as and for the purpose set forth.

3. In a horse hay-rake, the combination of the teeth having the rearward extensions on their rear ends, wheels C, for supporting the rear end of the rake, and the bails H, having their rear ends secured to the extensions, substantially as specified.

In testimony that I claim the foregoing as my own I have hereto affixed my signature in presence of two witnesses.

JAMES HANLEY BARLEY.

Witnesses:
THOMAS MONROE,
C. L. JACKSON.